US011867267B1

(12) United States Patent
King et al.

(10) Patent No.: US 11,867,267 B1
(45) Date of Patent: Jan. 9, 2024

(54) CLUTCH FOR TRANSMISSION ASSEMBLY

(71) Applicant: Deere & Company, Moline, IL (US)

(72) Inventors: Kevin R. King, Waterloo, IA (US);
Thomas G. Ore, Cedar Falls, IA (US);
Clayton P. Neumann, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/974,963

(22) Filed: Oct. 27, 2022

(51) Int. Cl.
*F16H 3/72* (2006.01)
*F16H 37/08* (2006.01)

(52) U.S. Cl.
CPC .......... *F16H 3/728* (2013.01); *F16H 37/084* (2013.01); *F16H 2037/0886* (2013.01)

(58) Field of Classification Search
CPC . F16H 3/728; F16H 37/084; F16H 2037/0886
USPC ........................................................ 192/48.1
See application file for complete search history.

(56) References Cited

U.S. PATENT DOCUMENTS

| 2,672,964 | A | | 3/1954 | Bonney |
| 5,577,973 | A | * | 11/1996 | Schmidt ............... B60W 10/115 903/910 |
| 9,261,064 | B2 | | 2/2016 | Patel et al. |
| 11,137,052 | B2 | | 10/2021 | Ore et al. |
| 11,325,459 | B2 | | 5/2022 | Ore |
| 2006/0142104 | A1 | * | 6/2006 | Saller ...................... F16H 3/728 475/5 |

\* cited by examiner

*Primary Examiner* — Colby M Hansen
(74) *Attorney, Agent, or Firm* — Tucker Ellis LLP; Evan R. Sotiriou

(57) ABSTRACT

One or more techniques and/or systems are disclosed for a clutch configuration and/or clutch operation. The clutch configuration includes an arrangement having a transmission input shaft having a conduit therethrough and a rotating clutch drum configured to rotatably couple to the transmission input shaft and operate independent of the transmission input shaft. The rotating clutch drum has a conduit complementary to the conduit of the transmission input shaft. The clutch arrangement further includes a bearing spacer between the transmission input shaft and the rotating clutch drum, wherein the bearing spacer has a conduit complementary to the conduit of the transmission input shaft and the conduit of the rotating clutch drum. The conduits of the bearing spacer, the transmission input shaft, and the rotating clutch drum define a clutch apply pressure path to control actuation of the rotating clutch drum.

18 Claims, 9 Drawing Sheets

US 11,867,267 B1

CLUTCH FOR TRANSMISSION ASSEMBLY

BACKGROUND

Vehicles, such as tractors and other work vehicles, can include powertrains having multiple modes of operation. In some configurations, the powertrains are operable with a traditional engine (e.g., an internal combustion engine) and at least one continuously variable power source (CVP) (e.g., an electric motor/generator or hydraulic motor/pump, etc.) that provides power to an output member. In some arrangements, the CVP and the output member may be operatively connected via an infinitely variable transmission (IVT) or continuously variable transmission (CVT).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a clutch configuration and/or clutch operation, such as in an EVT (electric variable transmission) of a tractor or other work vehicle. For example, an independently rotating clutch drum can be actuated and operates independent of a transmission input shaft.

In one implementation, a clutch arrangement includes a transmission input shaft having a conduit therethrough and a rotating clutch drum configured to rotatably couple to the transmission input shaft and operate independent of the transmission input shaft. The rotating clutch drum has a conduit complementary to the conduit of the transmission input shaft. The clutch arrangement further includes a bearing spacer between the transmission input shaft and the rotating clutch drum, wherein the bearing spacer has a conduit complementary to the conduit of the transmission input shaft and the conduit of the rotating clutch drum. The conduits of the bearing spacer, the transmission input shaft, and the rotating clutch drum define a clutch apply pressure path to control actuation of the rotating clutch drum.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
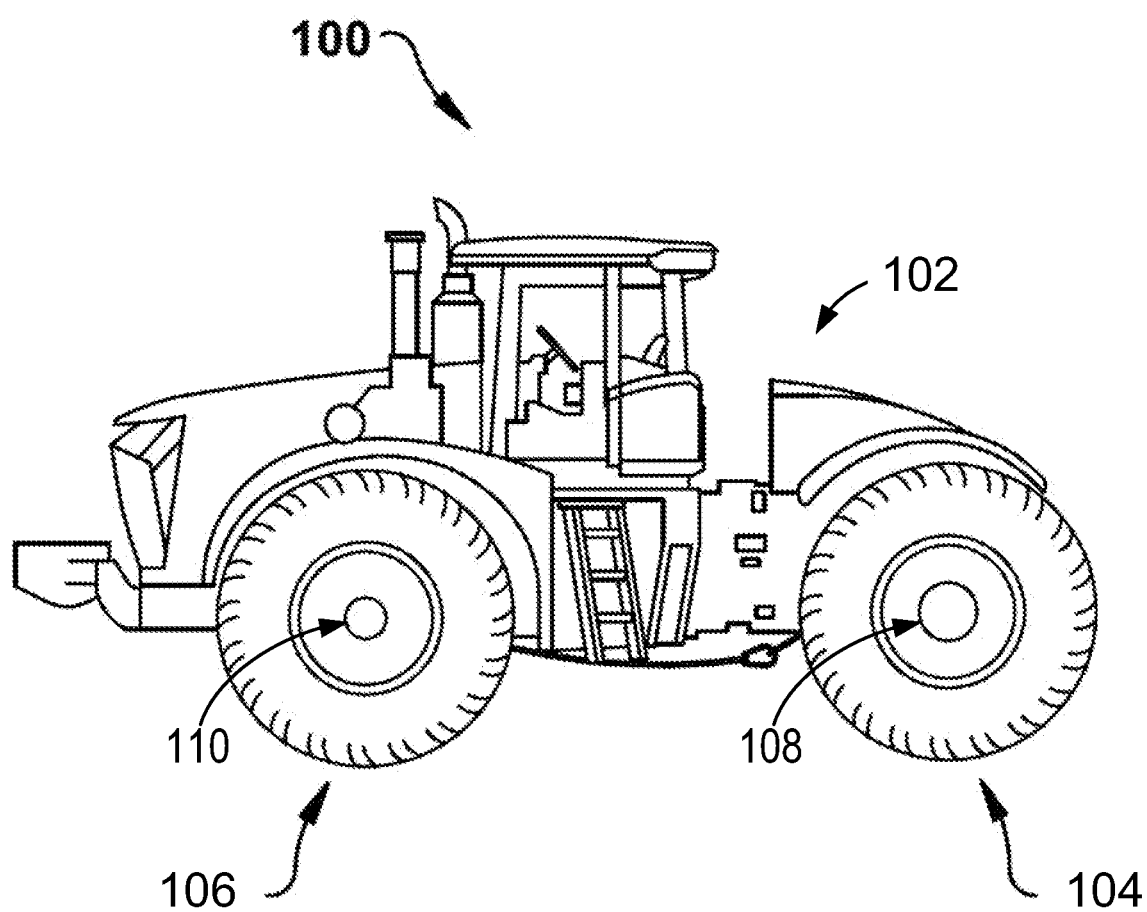
FIG. 1 is a component diagram illustrating an example implementation of a vehicle in which various examples can be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different transmission applications, such as for different engine and power transmission applications and in different vehicles. That is, the herein disclosed examples can be implemented in combination with different transmission systems or assemblies other than for particular vehicles, such as other than for farm vehicles (e.g., tractors).

FIG. 1 is a component diagram illustrating an example implementation of a system that may utilize one or more portions of the aspects and examples described herein. In the implementation illustrated in FIG. 1, a vehicle 100, such as a tractor, can perform different operations, such as a ground working operation in a field. In some implementations, the vehicle 100 has wheels 104, 106 installed thereon. In other implementations, the vehicle 100 has track systems (not shown) instead of wheels installed on the rear or both the front and rear of the vehicle 100. The wheel 104 is operable to rotate about an axle 108, illustrated as a rear axle, and the wheel 106 is operable to rotate about an axle 110, illustrated as a front axle.

The vehicle 100 includes a chassis 102, which provides attachment points for the vehicle 100. For example, a work tool (e.g., a bucket, fork, blade, auger, or hammer) can be connected to the front or back of the chassis 102. The work tool is movably connected to the chassis 102 in some examples.

The vehicle 100 further includes a powertrain with a transmission assembly having a clutch arrangement as described in more detail herein. For example, the clutch arrangement includes an independently rotating clutch drum operable with an EVT in multiple transmission modes of the transmission assembly of the vehicle 100. The clutch arrangement in various examples allows for the transmission assembly to provide selection between one of the plurality of transmission modes in which the transmission assembly transmits power from the engine and/or the CVP to the output shaft without the use of an additional countershaft and provides improved flexibility of electric motor placement in the transmission assembly. In some examples, the clutch arrangement provides a space saving configuration of one or more continuously variable machines (CVMs), such as electric machines (e-machines) within the CVP. In various examples, the clutch arrangement provides a smaller CVP package with the same performance and a lower cost than larger CVP packages. Also, reducing the number of parts or changing the configuration as provided by one or more examples of the CVT can result in a smaller CVT package that is easier to assemble and lower in cost.

While various examples are described in connection with a tractor or clutch and transmission arrangement having a particular configuration, the systems and methods described herein may also be utilized with other types of vehicles and implements. For example, the vehicle may comprise another utility-type vehicle, such as a truck, hauler, semi-tractor, or any vehicle that uses a transmission assembly, such as any vehicle with one or more gears. One or more herein described aspects can be implemented in a work vehicle, such as a backhoe loader, but may be any work vehicle with a transmission assembly, such as an articulated dump truck, compact track loader, crawler (e.g., crawler dozer, crawler loader), excavator, feller buncher, forwarder, harvester, knuckleboom loader, motor grader, scraper, skidder, sprayer, skid steer, tractor, tractor loader, and wheel loader, among others. The various examples can also be implemented in other work vehicles, passenger vehicles, or other equipment having transmission assemblies.

Figure 2:
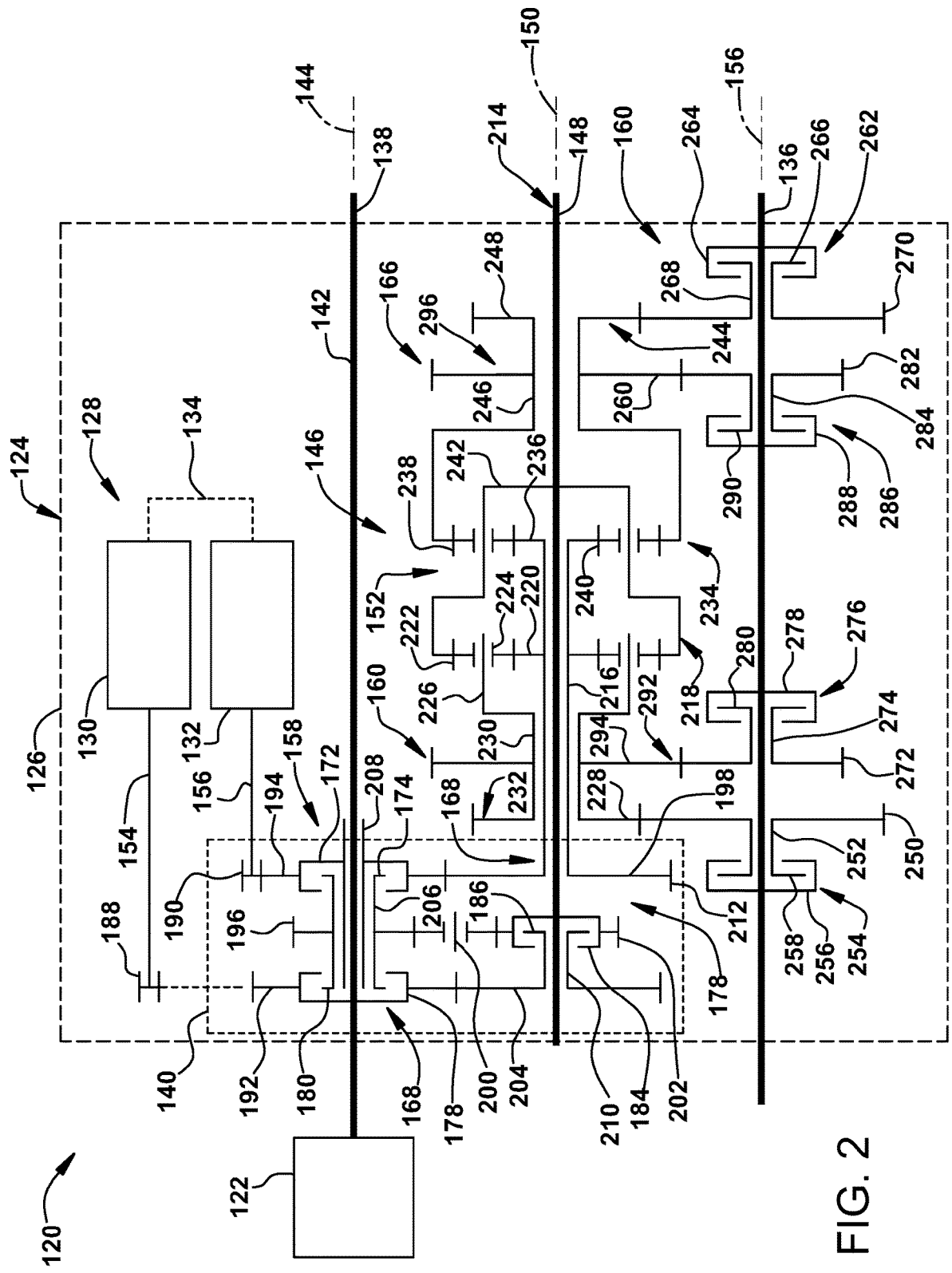
FIG. 2 is a schematic diagram illustrating a power train according to one implementation.

The vehicle 100 in one example is a tractor that includes and/or operates with a powertrain 120 as illustrated in FIG. 2. The powertrain 120 in the illustrated example is configured to generate power and to transmit the power from an engine 122 and/or other power sources to an output member (e.g., an output shaft). In some examples, the powertrain 120 transmits the power to the rear axle 108 and/or to the front axle 110 of the vehicle 100. However, the powertrain 120 can be configured for delivering power to a power take-off shaft for powering an implement that is supported on the vehicle 100 or that is supported on a separate vehicle as described in more detail herein. It should be appreciated that the powertrain 120 can be configured for delivering power to other power sinks without departing from the herein described examples.

Referring now particularly to FIG. 2, an example configuration of the powertrain 120 is depicted schematically. The powertrain 120 includes the engine 122, which may be an internal combustion engine of various known configurations. The powertrain 120 also includes a transmission assembly 124 with a housing 126 that at least partially houses a CVP 128. The CVP 128 includes at least one CVM, such as an e-machine or a hydraulic machine. In the illustrated example, the CVP 128 includes a first CVM 130 and a second CVM 132. As shown in FIG. 2, the first CVM 130 may be operably connected to the second CVM 132 via a conduit 134, such as one or more electrical wires.

The transmission assembly 124 includes a plurality of components, such as shafts, gears, gear sets, clutches, brakes, and/or other components, that interconnect to enable the transfer power amongst the engine 122, the first CVM 130, and/or the second CVM 132 to appropriately power an output shaft 136 and/or one or more other output members. For example, the output shaft 136 may form or may be directly connected to one or more power sinks (e.g., one or both axles 108, 110) of the vehicle 100. An additional power output of the transmission assembly 124 may be one or more power take-off ("PTO") shaft elements 138. In some examples, a torque converter or other device is included between the engine 122 and the output shaft 136 (or another shaft (not shown)), although such a device is not necessary for the operation of the powertrain 120, as contemplated herein. Further, in some examples, multiple shafts (not shown), including various shafts interconnected by various gears or other power transmission components, or equivalent power transmission components (e.g., chains, belts, and so on) can be included.

The transmission assembly 124 may be considered a continuously variable transmission or an infinitely variable transmission. Also, the transmission assembly 124 can be configured to provide selection between one of the plurality of transmission modes in which the transmission assembly 124 transmits power from the engine 122 and/or the CVP 128 to the output shaft 136.

In addition to providing rotational power to the output shaft 136, the engine 122 can also provide rotational power to the first CVM 130 via the transmission assembly 124. Continuing with this example, the first CVM 130 converts the received power to an alternate form (e.g., electrical or hydraulic power) for transmission over the conduit 134. This converted and transmitted power is received by the second CVM 132 and then re-converted by the second CVM 132 to provide a rotational power output. Various known control devices (not shown) can be provided to regulate such conversion, transmission, re-conversion and so on.

In some examples, the first CVM 130 and the second CVM 132 are both e-machines. Also, in some examples, the first and/or second CVMs 130, 132 are configured to operate as a motor (to output mechanical power from electrical input power) and as a generator (to output electrical power from mechanical input power). Although the CVMs 130, 132 are depicted in a particular orientation in the examples below, the CVMs 130, 132 can have other configurations.

In some examples, the transmission assembly 124 includes an input arrangement 140 with an input shaft 142 defining an input axis 144. The input arrangement 140 in various examples is substantially centered with respect to the input axis 144. The input axis 144 may represent an axis of rotation for at least a portion of the input arrangement 140. Accordingly, the input arrangement 140 in some examples includes at least one input component, discussed below, that is supported for rotation about the input axis 144 and/or other portions of the transmission assembly 124. As will be discussed in more detail herein, the engine 122 and the CVP 128 are operatively connected to the input arrangement 140 in some examples.

The transmission assembly 124 also includes a variator 146 with at least one variator shaft 148 defining an associated variator axis 150. The variator 146 is substantially centered with respect to the variator axis 150 in various examples. The variator 146 includes at least one variator component, discussed in more detail below, that is supported for rotation about the variator axis 150. The variator 146 is operably connected to the engine 122 and the CVP 128 via the input arrangement 140. In various examples, the variator 146 and/or input arrangement 140 include a variety of devices capable of summing the mechanical inputs from the engine 122 and the CVP 128 for a combined mechanical output to the output shaft 136 for split-path power transmission. In the example illustrated in FIG. 2, the variator 146 is configured with a summing planetary gear set group 152 (e.g., a double planetary gear set group), as described in more detail below. It should be appreciated, however, that other configurations are possible.

The transmission assembly 124 in some examples includes an output arrangement 154 at least partially formed by the output shaft 136 defining an output axis 156. The output arrangement 154 is substantially centered with respect to the output axis 156 in some examples. The output axis 156 may represent an axis of rotation for the output arrangement 154. Accordingly, the output arrangement 154 includes at least one output component, discussed in more detail below, that is supported for rotation about the output axis 156. As such, the output arrangement 154 delivers power from the variator 146 to the output shaft 136. Generally, the clutches and gears associated with the variator 146 and the output arrangement 154 are collectively considered a transmission gear arrangement that transfers power, as appropriate or desired, to the output shaft 136.

In some examples, the variator 146 is disposed between and operatively connected to the input arrangement 140 and the output arrangement 154, thereby resulting in power flows along paths from the input arrangement 140, through the variator 146, and to the output arrangement 154. In this arrangement, the transmission assembly 124 does not include a countershaft and/or countershaft components, e.g., the modes described below are provided with three primary shafts.

In some examples, the input axis 144, the variator axis 150, and the output axis 156 are substantially parallel and spaced apart at a distance from each other, although arrangements may vary. Accordingly, as discussed in more detail herein, the transmission assembly 124 can be configured for different work vehicles with different packaging requirements.

The transmission assembly 124 in various examples is configured as a multi-mode transmission and provides selective shifting between the different modes. For example, the transmission assembly 124 can provide one or more split-path power transmission modes. In each of these modes, power from the engine 122 and the CVP 128 are combined or summed (e.g., by the variator 146), and the resulting combined or summed power is delivered to the output shaft 136. In one split-path mode, the output shaft 136 is rotated within a first speed range, and in another split-path mode, the output shaft 136 is rotated within a second speed range. The second speed range is higher than the first speed range in some examples. There can be additional split-path modes providing other speed ranges for the output shaft 136 as should be appreciated.

Additionally, the transmission assembly 124 provides one or more CVP-only modes in some examples. For example, the transmission assembly 124 can, in a sense, disconnect the engine 122 from the output shaft 136 and instead deliver CVP power from the CVP 128 to the output shaft 136. In some examples, the speed range for the output shaft 136 during the CVP-only mode may be relatively low. For example, the transmission assembly 124 can provide the CVP-only mode at which torque is maintained at the output shaft 136 while the output shaft 136 remains stationary (i.e., angular velocity of zero). This is referred to as "powered zero". The output shaft 136 can be driven at relatively low speeds (i.e., "creeper speeds") as well in this CVP-only mode.

As shown in FIG. 2, the transmission assembly 124 includes a set of selective transmission components (e.g., a control set) for selecting between the different transmission modes. The selective transmission components can include wet clutches, dry clutches, dog collar clutches, brakes, or other similar components that selectively move between an engaged position and a disengaged position. More specifically, a representative selective transmission component can include a first member and a second member that engage each other (e.g., fixedly attach together for rotation as a unit) and, alternatively, disengage from each other (e.g., detach to allow relative rotation between the two). Although not shown, the control set can be connected to a control system for controlling actuation of the individual transmission component members.

Accordingly, as will be discussed in more detail herein, the transmission assembly 124 in various examples provides effective power transmission across a number of modes such that the powertrain 120 is highly efficient. As a result, the transmission assembly 124 enhances fuel efficiency of the vehicle 100. Also, the transmission assembly 124 is relatively compact and has a relatively simple design and assembly in various examples. Additionally, the transmission assembly 124 is highly configurable in various examples, such that the transmission assembly 124 can be tailored for a particular vehicle 100 (e.g., to meet packaging requirements).

As discussed above, portions of the transmission assembly 124 are housed in the transmission assembly housing 126 that is schematically depicted in FIG. 2. Generally, the transmission assembly 124 and/or transmission assembly housing 126 may be considered to have first and second sides (or left and right sides in the view of FIG. 2) that represent the physical orientation of the transmission assembly 124 as implemented, although any suitable orientation or arrangement of transmission components may be provided.

The transmission assembly 124 will be now discussed in detail according to an example implementation. As discussed herein, the input arrangement 140 includes a number of clutches that facilitate the transfer of power between the engine 122, the CVP 128, and the variator 146. In one example, the input arrangement 140 includes first, second, and third clutches 158, 168, 178. As described herein, the first clutch 158 may be referred to as a creeper clutch; the second clutch 168 may be referred to as a reverse clutch; and the third clutch 178 may be referred to as a forward clutch. These clutches 158, 168, 178 are selectively controlled by a controller (not shown) to appropriately distribute power from and between the engine 122, CVP 128, and/or variator 146 to modify the direction and/or speed of power flow to the output shaft 136. The input arrangement 140 further includes a number of gears 188, 190, 192, 194, 196, 198, 200, 202, 204 and hollow shafts 206, 208, 210 that transfer power, as will now be described.

As shown, a first gear 188 is fixed for rotation on the first CVM shaft 164. The first gear 188 is positioned to transfer power (e.g., enmeshed or otherwise) with a third gear 192 mounted on the reverse clutch 168. The reverse clutch 168 generally circumscribes and is supported for various rotations about the input shaft 142. In particular, the reverse clutch 168 include at least one first member 178 (e.g., first clutch plate(s)) on which is mounted the third gear 192 that is fixed for rotation with the first member 178 of the reverse clutch 168. The reverse clutch 168 also includes at least one second member 180 (e.g., second clutch plate(s)) that is fixed for rotation on an end of a first hollow shaft 206 in some examples.

In this arrangement, the first CVM shaft 164 is connected to the first CVM 130 as an input shaft such that, when the reverse clutch 168 is engaged (e.g., the first and second members 178, 180 of the reverse clutch 168 are forced to engage to rotate as a unit), power is transferred from the first hollow shaft 206, through the reverse clutch 168, and through the third and first gears 192, 188 to drive the first CVM shaft 164, and thus the first CVM 130. The reverse clutch 168 can be disengaged (e.g., the first and second members 178, 180 are disengaged or released) to cut off this power flow.

A second gear 190 is fixed for rotation on the second CVM shaft 166 and is positioned to transfer power (e.g., enmeshed) with the fourth gear 194 mounted on the creeper clutch 158. The creeper clutch 158 generally circumscribes and is supported for various rotations about the input shaft 142. In particular, the creeper clutch 158 includes at least one first member 172 (e.g., first clutch plate(s)) on which is mounted a fourth gear 194 that is fixed for rotation with the first member 172 of the creeper clutch 158. The creeper clutch 158 also includes at least one second member 174 (e.g., second clutch plate(s)) that is fixed for rotation on an end of the first hollow shaft 206.

In this example, the second CVM shaft 166 is connected to the second CVM 132 as an output shaft such that, when the creeper clutch 158 is in an engaged position (e.g., the first and second members 172, 174 of the creeper clutch 158 are forced to engage to rotate as a unit), power is transferred from the second CVM 132, through the second and fourth gears 190, 194, and through the creeper clutch 158 to drive the first hollow shaft 206 and associated components, described in greater detail below. The creeper clutch 158 has a disengaged position (e.g., the first and second members 172, 174 are disengaged or released) to enable relative rotation and disconnect this power flow.

The first member 172 of the creeper clutch 158 is mounted on and fixed to a second hollow shaft 208. The second hollow shaft 208 receives a portion of the first hollow shaft 206 and is supported for rotation about the input axis 144. Further, the first hollow shaft 206 surrounds the input shaft 142 and is supported for rotation about the input axis 144. The second hollow shaft 208 is surrounded by the first hollow shaft 206 that is also supported for relative rotation. As described herein, the first end of the first hollow shaft 206 supports and rotates with the second member 174 of the creeper clutch 158 and the second end of the first hollow shaft 206 supports and rotates with the second element of the reverse clutch 168.

In addition to the second gear 190, the fourth gear 194 mounted on the first member 172 of the creeper clutch 158 is enmeshed with a sixth gear 198. The sixth gear 198 is fixed on the end of a first input member 212 of the planetary gear set group 152. As a result of this arrangement, the second CVM 132 is configured to provide rotational input to the planetary gear set group 152 via the second CVM shaft 166, the second gear 190, the fourth gear 194, and the first input member 212.

A fifth gear 196 is fixed to the first hollow shaft 206. The fifth gear 196 is interposed on the first hollow shaft 206 between the creeper clutch 158 and the reverse clutch 168. The fifth gear 196 is enmeshed with a seventh gear 200, which in this example is an idler gear. The idler gear 200 is supported for rotation about an idler axis, which in this example, may be parallel to and spaced apart from the input axis 144.

The idler gear 200 is enmeshed with an eighth gear 202. The eighth gear 202 is supported on the forward clutch 178 for rotation about the variator axis 150. As described above, the forward clutch 178 includes at least one first member 184 and at least one second member 186. The first member 184 is fixed to the eighth gear 202 for rotation about the variator axis 150. The second member 186 is fixed to an end of a third hollow shaft 210.

Generally, the third hollow shaft 210 is configured to receive a portion of the variator shaft 148. Additionally, a ninth gear 204 is fixed on the third hollow shaft 210 on an end opposite the forward clutch 178. The ninth gear 204 is enmeshed with the third gear 192 mounted on the first member 178 of the reverse clutch 168. The first member 184 of the forward clutch 178 is also fixed to the variator shaft 148.

As such, the forward clutch 178 has an engaged position between the first member 184 and the second member 186 to allow power transmission between the third hollow shaft 210 and the eighth gear 202. The forward clutch 178 further has a disengaged position in which the first and second members 184, 186 are disengaged to cut off the power transmission path between the first member 184 of the forward clutch 182 and the third hollow shaft 210, while maintaining the power transmission path between the first member 184 of the forward clutch 178 and the variator shaft 148.

In addition to the first input member 212, the variator shaft 148 (and the gears fixed thereto) can be considered a second input member 214 of the planetary gear set group 152, and thus, the variator 146. Like the reverse clutch 168 and the creeper clutch 158, the forward clutch 178, the third hollow shaft 210, and the ninth gear 204 are generally proximate to a common side of the transmission assembly housing 126, particularly relative to the variator 146, although other configurations can be provided. As such, input that flows through the forward clutch 178 is transferred to the variator shaft 148, and more generally, into the variator 146.

As discussed in more detail above, the variator 146 includes the planetary gear set group 152, which in this example is a double planetary gear set group. However, it should be appreciated that the variator 146 can vary from the illustrated implementation without departing from the scope of the various examples. Furthermore, it should be appreciated that the variator 146 can include a plurality of variator members, some of which may serve as power inputs and some of which serve as power outputs, depending on the mode in which the transmission assembly 124 is operating.

In the illustrated example, the planetary gear set group 152 circumscribes and is at least partially mounted on a fourth hollow shaft 216. The fourth hollow shaft 216 receives the variator shaft 148 to selectively rotate about the variator axis 150. One end of the fourth hollow shaft 216 forms the first input member 212 of the planetary gear set group 152 to receive power transfer via the sixth gear 198 mounted to the fourth hollow shaft 216.

In this example, the planetary gear set group 152 includes a first planetary gear set 218 (a low planetary gear set) with a first sun gear 220, a first ring gear 222, and a plurality of first planet gears 224 with a respective first carrier 226. The first sun gear 220 is fixed to the fourth hollow shaft 216 for rotation about the variator axis 150. The first planet gears 224 are enmeshed with and disposed between the first sun gear 220 and the first ring gear 222. The first planet gears 224 and the first carrier 226 are configured to rotate together about the variator axis 150. Likewise, the first ring gear 222 is centered on and supported for rotation about the variator axis 150.

In addition, the variator 146 includes a first output member 228. The first output member 228 is mounted on a relatively short, fifth hollow shaft 230 that receives the fourth hollow shaft 216 and the variator shaft 148. The fifth hollow shaft 230, and thus the first output member 228, are fixed to the first carrier 226 for rotation therewith about the variator axis 150. A tenth (or first variator output) gear 232 is fixed on the first output member 228. In some examples, the first variator output gear 232 is disposed axially between the first (or low) planetary gear set 218 and the sixth gear 198 with respect to the variator axis 150. The variator 146 further includes a second output member 292 that includes an eleventh (or second variator output) gear 294 arranged on the shaft 230 in a position, in this example, in-between the tenth gear 232 (e.g., with the first output member 228) and the planetary gear set group 152. As such, the fifth hollow shaft 230 supports two of the gears 232, 294 providing power flow paths between the variator 146 and the output arrangement 154.

Moreover, the planetary gear set group 152 of the variator 146 includes a second planetary gear set 234 (a high planetary gear set) with a second sun gear 236, a second ring gear 238, and a plurality of second planet gears 240 with an associated second carrier 242. The second sun gear 236 is fixed to the fourth hollow shaft 216 for rotation about the variator axis 150. The second planet gears 240 are enmeshed with and disposed between the second sun gear 236 and the second ring gear 238. The second planet gears 240 and the second carrier 242 are configured to rotate together about the variator axis 150. The second carrier 242 is also attached to the first ring gear 222. Likewise, the second ring gear 238 is centered on and supported for rotation about the variator axis 150. In some examples, a first end of the second carrier 242 is fixed to the variator shaft 148, and the second end of the second carrier 242 is fixed to the first ring gear 222.

The variator 146 (and planetary gear set group 152) also includes a third output member 244. The third output member 244 includes a relatively short, hollow shaft (or sixth shaft) 246 that receives the variator shaft 148 and has one end fixed to the second ring gear 238 for rotation therewith about the variator axis 150. A twelfth gear (or third variator output gear) 248 is also fixed on the shaft 246 of third output member 244. In some examples, the third variator output gear 248 is disposed axially to one side of the second (or high) planetary gear set 234 and the forward clutch 178 with respect to the variator axis 150, e.g., in the example of FIG. 2, on the left side of the second (or high) planetary gear set 234 and the forward clutch 178. Thus, in some examples, the third variator output gear 248 is disposed on an opposite side of the variator 146 as compared to the first and second variator output gears 232, 294.

The fourth output member 296 further includes a thirteenth gear (or fourth variator output gear) 260 that is fixed to and rotates with the shaft 246. In the illustrated example, the fourth output member 296 and fourth variator output gear 260 are arranged axially in-between the third variator output gear 248 and the planetary gear set group 152. As such, the sixth hollow shaft 246 supports two of the gears 248, 260 providing power flow paths between the variator 146 and the output arrangement 154.

The output arrangement 154 is positioned within the transmission assembly 124 to appropriately deliver the power from the variator 146 to the output shaft 136. The output arrangement 154 includes a number of additional gears 250, 270, 272, 282, clutches 254, 262, 276, 286, and shafts 252, 268, 274, 284 arranged relative to the output shaft 136 to perform these functions.

For example, the transmission assembly 124 includes a fourteenth gear 250 supported for rotation about the output axis 156. In particular, the fourteenth gear 250 is fixed on an end of a seventh hollow shaft 252, which is centered about the output shaft 136. The transmission assembly 124 further includes a fourth clutch 254, which may be referred to as a "first range clutch" in some example. Like the above-described clutches, the fourth clutch 254 includes at least one first member 256 and at least one second member 258. The first member 256 is fixed to the seventh hollow shaft 252 for rotation about the output axis 156. The second member 258 is fixed to the output shaft 136. The output shaft 136 is received within the seventh hollow shaft 252. As such, the fourth clutch 254 has an engaged position to allow power transmission from the seventh hollow shaft 252 to the output shaft 136 via clutch members 256, 258. The first and second clutch members 256, 258 alternatively disengage in a disengaged position of the fourth clutch 254 to cut off this power transmission path.

Additionally, the transmission assembly 124 includes a fifth clutch 262, which may be referred to as a "second range clutch" in some examples. Like the above-described clutches, the fifth clutch 262 includes at least one first member 264 and at least one second member 266. The first member 264 is fixed to the output shaft 136 for rotation about the output axis 156. The second member 266 is fixed to an end of an eighth hollow shaft 268. The second member 266 and the eighth hollow shaft 268 are supported for rotation about the output axis 156. As such, the fifth clutch 262 has an engaged position to allow power transmission from the eighth hollow shaft 268 to the output shaft 136 via clutch members 264, 266. The first and second clutch members 264, 266 alternatively disengage in a disengaged position of the fifth clutch 262 to cut off this power transmission path.

The transmission assembly 124 further includes a fifteenth gear 270. The fifteenth gear 270 is fixed to the eighth hollow shaft 268 on an end that is opposite that of the fifth clutch 262. The fifteenth gear 270 is enmeshed with the third variator output gear 248 of the third output member 244 of the variator 146. Additionally, the transmission assembly 124 includes a sixteenth gear 272. The sixteenth gear 272 is enmeshed with the fourteenth gear 250 and is fixed to one end of a ninth hollow shaft 274. The ninth hollow shaft 274 receives the output shaft 136 and is centered with a sixteenth gear 272 on the output axis 156 for rotation about the output axis 156.

The transmission assembly 124 includes a sixth clutch 276, which may be referred to as a "third range clutch" in some example. Like the above-described clutches, the sixth clutch 276 includes at least one first member 278 and at least one second member 280. The first member 278 is fixed to the ninth hollow shaft 274 for rotation about the output axis 156. The second member 280 is fixed to output shaft 136. The sixth clutch 276 has an engaged position to allow power transmission from the ninth hollow shaft 274 to the output shaft 136 via clutch members 278, 280. The first and second clutch members 278, 280 alternatively disengage in a disengaged position of the sixth clutch 276 to cut off this power transmission path.

The transmission assembly 124 further includes a seventeenth gear 282. The seventeenth gear 282 is enmeshed with the fourth variator output gear 260. The seventeenth gear 282 is also fixed to a tenth hollow shaft 284, which is centered on to receive, and supported for rotation about, the output axis 156.

Additionally, the transmission assembly 124 includes a seventh clutch 286, which may be referred to as a "fourth range clutch" in some examples. Like the above-described clutches, the seventh clutch 286 includes at least one first member 288 and at least one second member 290. The first member 288 is fixed to the tenth hollow shaft 284 for rotation about the output axis 156. The second member 288 is fixed to the output shaft 136. The seventh clutch 286 has an engaged position to allow power transmission from the tenth hollow shaft 284 to the output shaft 136 via clutch members 288, 290. The first and second clutch members 288, 290 alternatively disengage in a disengaged position of the seventh clutch 286 to cut off this power transmission path. Although not shown, in some examples, a parking brake is attached to one end of the output shaft 136 to selectively inhibit or prevent rotation of the output shaft 136.

In one example, all four range clutches 254, 262, 276, 286 are mounted for rotation about the output shaft 156. Moreover, in this example, the directions and speed ranges discussed herein may be implemented with only four range clutches 254, 262, 276, 286 (e.g., without additional range clutches, as well as without additional shafts).

In some examples, the transmission assembly 124 provides selection between at least two modes from the following: 1) one or more all-CVP creeper mode (including powered-zero); 2) one or more lower speed split-path field mode; and 3) one or more higher speed split-path field mode. Each of these may be forward modes for drivingly rotating the output shaft 136 in a forward direction (e.g., for moving the vehicle 100 forward). The transmission assembly 124 also provides one or more reverse modes for drivingly rotating the output shaft 136 in a reverse (opposite direction) (e.g., for moving the vehicle 100 in reverse) in some examples.

Thus, the transmission assembly 124 is configured to operate in different modes using different power flows. In some examples, the different modes (e.g., forward and reverse modes) of operation and power flow can be implemented such as described in U.S. Pat. No. 11,352,459. However, various different modes and power flows are contemplated and the operations and/power flows are not limited to specific examples. For example, as described in more detail herein, one or more power flows are configured to allow for independent rotating clutch drum operation, such as in the one or more all-CVP creeper mode (referred to as mode 1), such as illustrated in FIG. 3 and described in more detail below.

Figure 3:
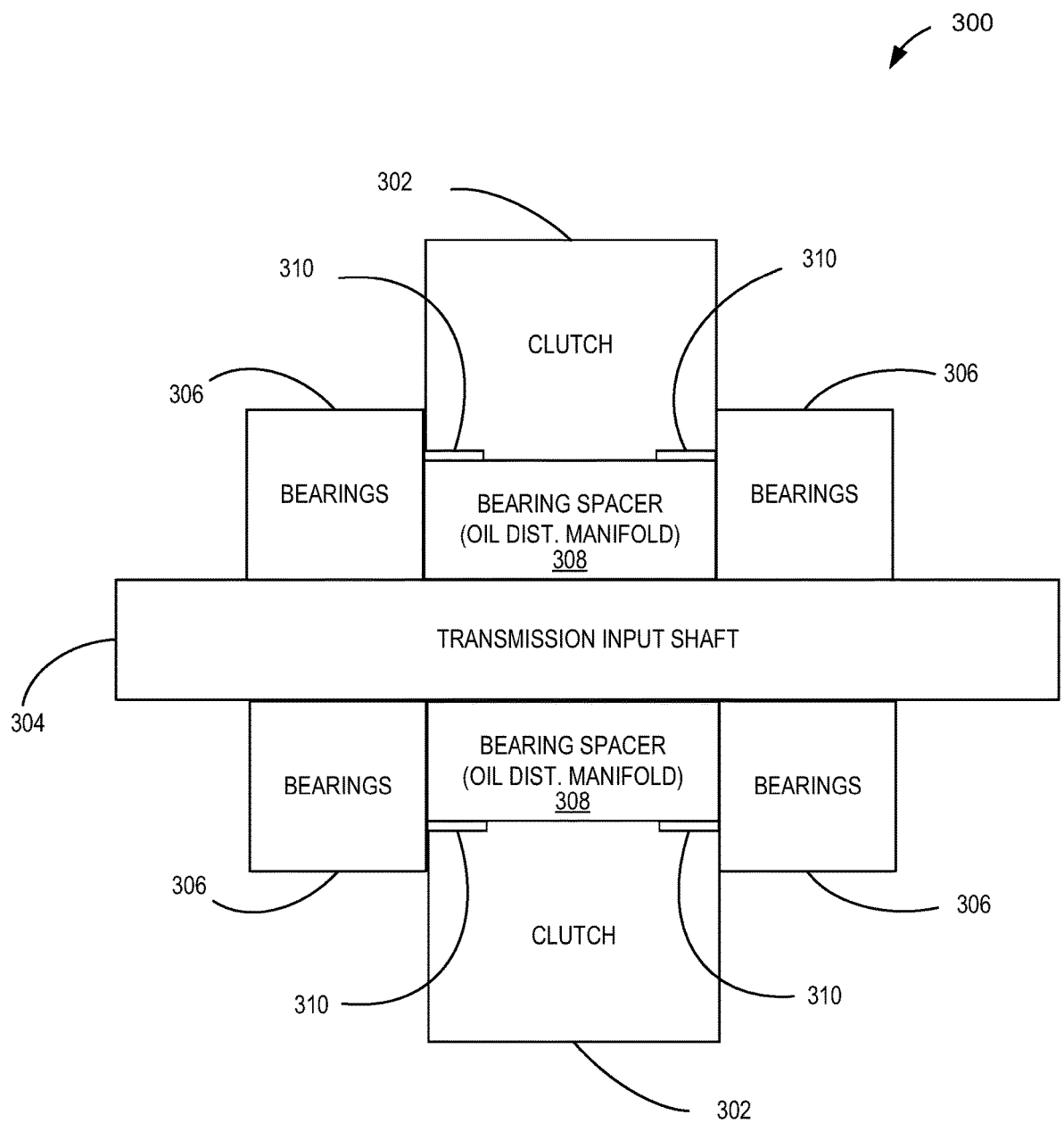
FIG. 3 is a block diagram illustrating a clutch arrangement according to one implementation.

More particularly, FIG. 3 illustrates a portion of a clutch arrangement 300 that in some examples is configured to operate as a mode 1 clutch in an EVT, such as available from John Deere. In various examples, a clutch 302 (e.g., mode 1 clutch) encircles a transmission input shaft 304, which improves packaging efficiency. For example, the clutch arrangement 300 allows operation without the use of an additional countershaft and enables one or more e-machines, such as electric motor generators (MGs) to be mounted within the housing 126 of the transmission assembly 124 (both shown in FIG. 1). That is, the clutch arrangement 300 allows for the electric MGs to be housed within the housing 126 instead of mounted to a countershaft outside the housing 126, as such, providing e-machine integration within the transmission assembly 124. In some examples, the clutch arrangement 300, and particularly the clutch 302 is embodied as the first clutch 158 (shown in FIG. 2). In particular, in various examples, the first clutch 158 is configured as the clutch 302 to operate independent of (e.g., freely rotate about) the input shaft 142 (shown in FIG. 2), for example, in a drum-over-shaft arrangement.

The clutch arrangement 300 includes bearings 306 configured wherein the clutch 302 is supported by the bearings 306 that are mounted on the transmission input shaft 304. As such, there is no direct speed or torque connection (e.g., no spline) between the clutch 302 and the transmission input shaft 304 acting as a supporting shaft. The transmission input shaft 304 is thereby allowed to freely spin at engine speed while the clutch 302 can co-rotate or counter-rotate around the transmission input shaft 304 independently. In various examples as described in more detail herein, clutch pressure is delivered to the clutch 302 through the transmission input shaft 304 and transmitted through the relative rotation by a tight fitting bearing spacer 308 (acting as an oil distribution manifold) as well as a set of seal rings 310. In various examples, the bearing spacer 308 rotates with the transmission input shaft 304. Advantageously, the clutch arrangement 300 does not require an additional countershaft to the transmission assembly 124 and improves flexibility of electric motor placement in the transmission assembly 124 as described in more detail herein. A cross-section of a portion of one example of the clutch arrangement 300 is illustrated in FIG. 4.

Figure 4:
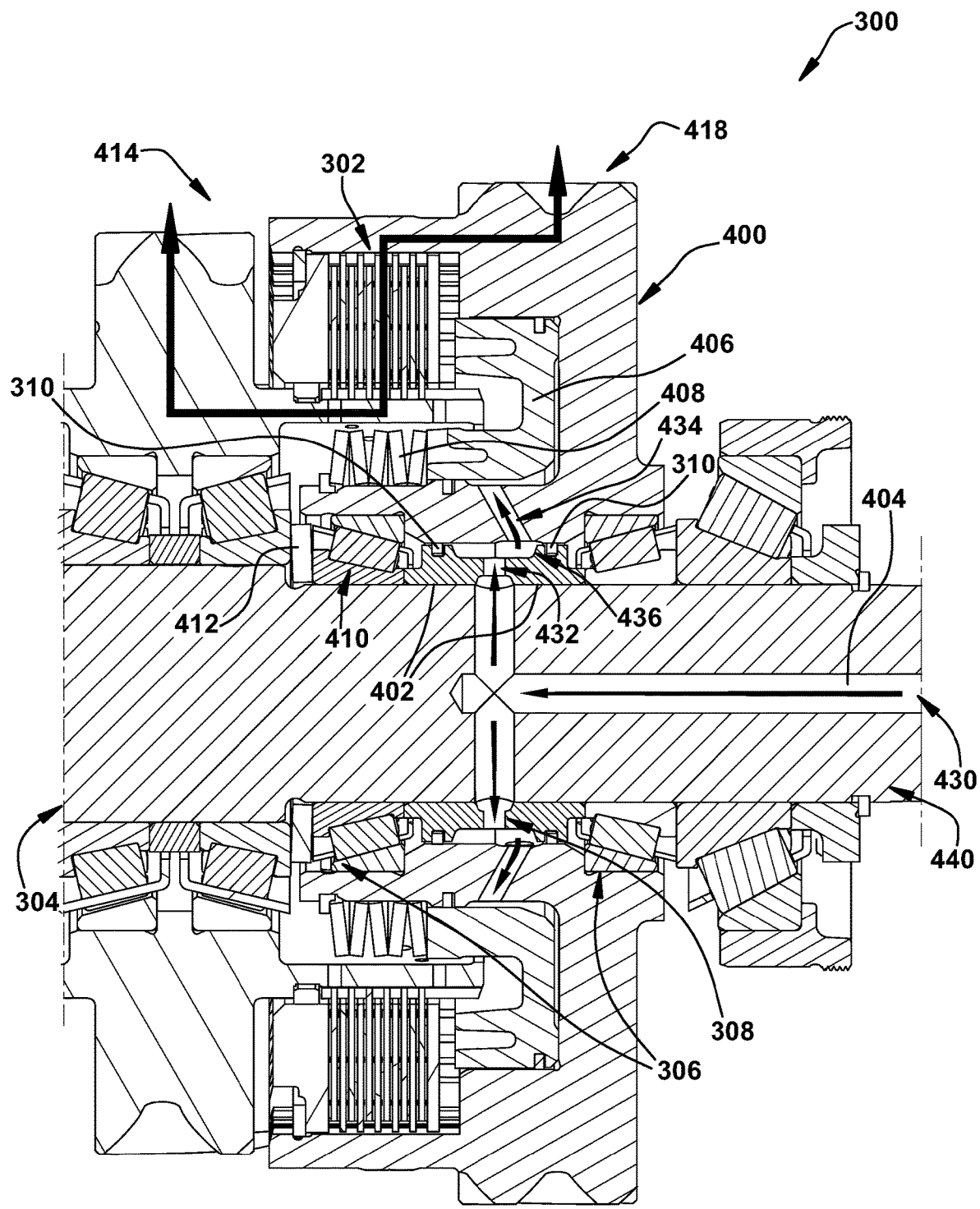
FIG. 4 is a cross-sectional view of a portion of a clutch arrangement according to one implementation.

As can be seen in FIG. 4, a rotating clutch drum 400 is movably coupled to the transmission input shaft 304 via the bearings 306, which are configured as clutch support bearings to support the rotating clutch drum 400 about the transmission input shaft 304 (e.g., mounted co-axial with the transmission input shaft 304). That is, the rotating clutch drum 400 is supported by, but can freely rotate independent of the transmission input shaft 304 that extends through the rotating clutch drum 400. For example, in operation, rotation of the transmission input shaft 304 does not cause rotation of the rotating clutch drum 400 that is configured and operable to rotate independent of the transmission input shaft 304 (e.g., rotate at a different speed). As such, the rotating clutch drum 400 is operable independent of the transmission input shaft 304 and any gears coupled with the transmission input shaft 304. As such, in various examples, there is no torque path between the rotating clutch drum 400 and the transmission input shaft 304. It should be noted that the rotating clutch drum 400 is an example of or may be embodied as the first member 172 of the creeper clutch 158 shown in FIG. 2.

As can be seen in the illustrated example, the rotating clutch drum 400 is rotatably coupled to the transmission input shaft 304 by the pair/set of bearings 306 and in combination with the associated pair/set of seal rings 310 forms a tight slip fit 402 between the rotating clutch drum 400 and the transmission input shaft 304. That is, the bearing and seal ring arrangement allows for rotation of the rotating clutch drum 400 about the transmission input shaft 304, while providing sufficient sealing for transmission of fluid through the transmission input shaft 304. The transmission input shaft 304 acts as a bearing support in various examples that allows for the independent rotation of the rotating clutch drum 400, including actuation thereof by applying pressure through a clutch apply pressure path 404 (e.g., an oil pressure apply path illustrated by the arrows). As can be seen the clutch apply pressure path 404 extends axially (e.g., longitudinally in a first direction) a distance within the transmission input shaft 304 and then extends perpendicularly (in a second direction) and radially outwardly towards the rotating clutch drum 400 to apply pressure to gear(s) within the rotating clutch drum 400. That is, the clutch apply pressure path 404 is configured to allow an actuation pressure (e.g., oil flow through the transmission input shaft 304) to be applied to the gears to cause the rotating clutch drum 400 to operate in an engaged state and to remove the actuation pressure to the rotating clutch drum 400 to operate in a disengaged state. As such, the apply pressure path 404 defines an oil (or other fluid) path or passage through the transmission input shaft 304 (e.g., in first and second directions through a body 440 of the transmission input shaft 304) to allow the oil to flow to the rotating clutch drum 400 for gear operation (e.g., gear engagement and disengagement). The apply pressure path 404 in some examples is a bore or conduit 430 within the transmission input shaft 304 that defines a pathway or passageway for transmission of oil therethrough and to a corresponding, complementary or mating bore or conduit 432 in the bearing spacer and then through a bore or conduit 434 in the rotating clutch drum 400.

In the illustrated example, the conduit 430 has a constant and greater diameter than at least portions of the conduits 432 and 434. The conduit 432 is a transition conduit changing in diameter from a diameter of the conduit 430 to a smaller diameter before expanding into a larger or reservoir portion 436. In one example, the conduit 434 in some examples also has a different diameter than the conduit 432, for example, a larger diameter than the conduit 432, but a smaller diameter than the conduit 430. It should be noted that the size, including the relative sizes of the of the conduits 430, 432, 434 can be varied as desired or needed, and the herein described examples are merely for illustration. Additionally, the shape, orientation, etc. of the conduits 430, 432, 434 can also be varied as desired or needed, such as based on the type of transmission.

It should be appreciated that in both the engaged and disengaged states, the rotating clutch drum 400 floats around and rotates independent of the transmission input shaft 304. It should also be noted that the transmission input shaft 304 is coupled to the engine 122 (shown in FIG. 2) on the left side of the transmission input shaft 304 as viewed in FIG. 4 and the PTO shaft elements are is coupled to the transmission input shaft 304 on the right side of the transmission input shaft 304 as viewed in FIG. 4.

Continuing with the illustrated example, a piston 406 and a spring 408 of the rotating clutch drum 400 are operable with the clutch apply pressure path 404 to provide gear engagement and disengagement. That is, a power path is provided into the rotating clutch drum 400 through the clutch 302 (which in the illustrated examples includes splines) to a gear 414 and a gear 418. For example, oil from the clutch apply pressure path 404 pushes in the piston 406, which thereby operates as a clutch apply piston (C1 piston). The springs 408 are configured to push the piston 406 back when oil pressure is removed or reduced, such the springs 408 operate as return springs. In operation, with clutch engagement provided by the rotating clutch drum 400, power transmission is possible from the inner diameter (ID) to the outer diameter (OD) thereof, and vice versa. It should be appreciated that if the clutch 302 is closed, power flows into or out of the gear 414 and the gear 418 (power flow is illustrated by the arrow through the rotating clutch drum 400); and if the clutch 302 is open, the rotating clutch drum 400 acts as an idler and take power from an MG (e.g., MG2 as described in more detail herein) and passes the corresponding torque and power to the first sun gear 220 (shown in FIG. 2). Thus, when the clutch 302 is engaged, the gears 414 and 418 are connected via the clutch 302, and the gears 414 and 418 continue to rotate independently of the transmission input shaft 304. As such, the gears 414 and 418 operate independent of the transmission input shaft 304.

In the illustrated example, the bearings 410 define a statistically set bearing set wherein the bearing setting is maintained by a spring 412. That is, the spring 412 maintains the position and orientation of the bearings 410 (e.g., the corresponding racers and spacers are maintained in a fixed arrangement). In various examples, the arrangement of the bearings 410 and the bearing spacer 308 maintains the configuration shown in FIG. 4 to allow transmission of fluid between surfaces rotating at different speeds, namely the relative speed of the bearing spacer 308 and the ID of the rotating clutch drum 400 (e.g., the e-machine rotates at about 10,000 RPM and the shaft is coupled to the engine 122 and rotates at 900-1900 RPM). In various examples, the clutch apply pressure path 404 after passing through the bearing spacer 308 with the rotating drum sealing rings 310, is angled towards the piston 406. That is, the clutch apply pressure path 404 is angled relative to the longitudinal axis of the transmission input shaft 304. In some examples, the angle of the clutch apply pressure path 404 within the rotating clutch drum 400 is in the direction of engagement motion of the piston 406, which to the left as viewed in FIG. 4.

Figure 5:
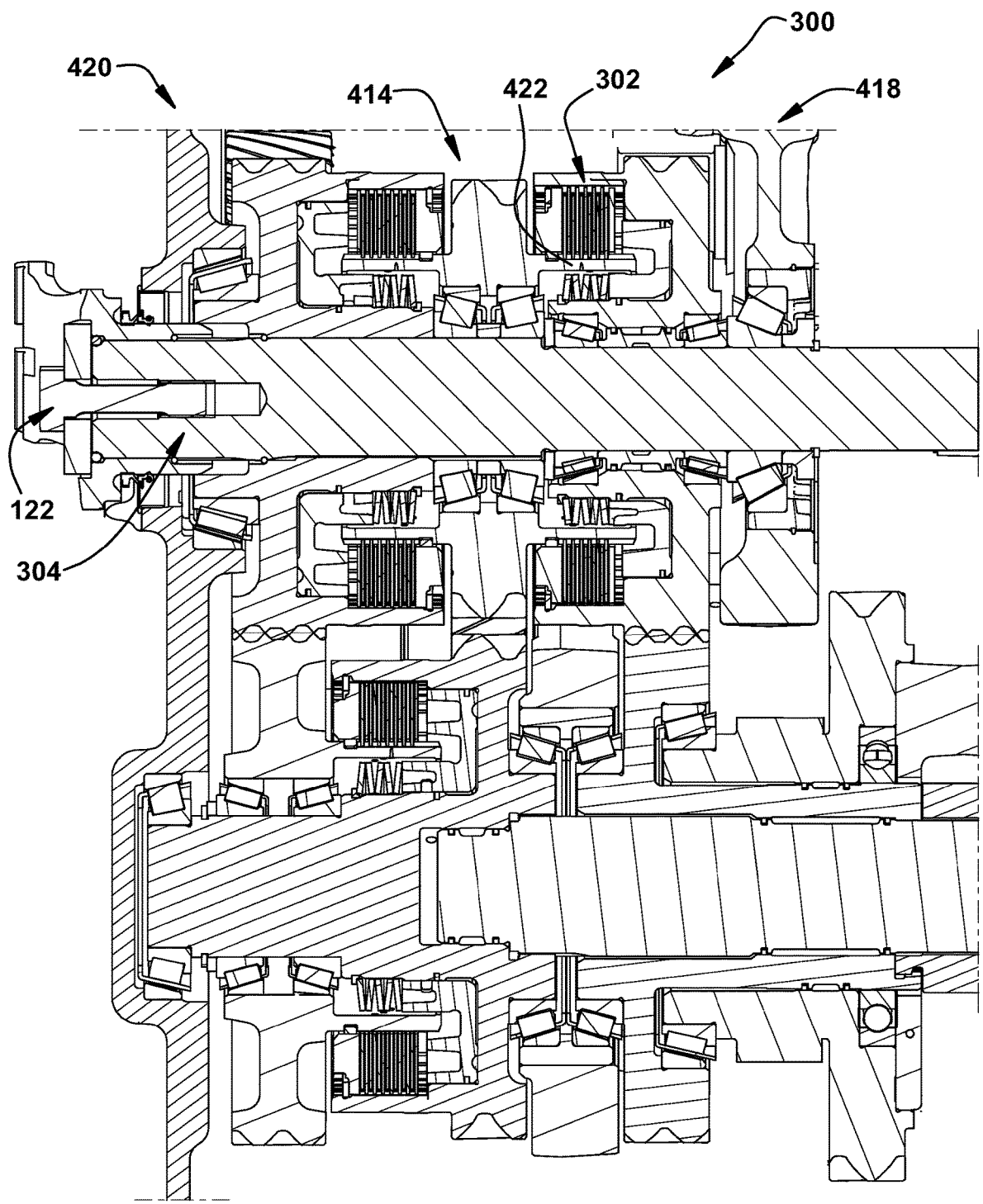
FIG. 5 is another cross-sectional view of a portion of a clutch arrangement according to one implementation.

As can be seen in FIG. 5, the engine 122 drives the transmission input shaft 304 having the clutch arrangement 300 radially supported by the transmission input shaft 304 with no torque coupling or connection to the transmission input shaft 304. That is, while other gears, such as the gear 418 and a gear 420 have a torque coupling to the transmission input shaft 304 to provide operation in different modes (e.g., reverse mode or creeper mode), the clutch arrangement 300 rotates freely and independently of the transmission input shaft 304. As such, the operation and rotation of the clutch arrangement 300 including the gear 414 is independent of the operation of the transmission input shaft 304 and the other gears. It should be noted that FIG. 5 illustrates an example of or may be embodied as the input arrangement 140 shown in FIG. 2.

As can be further seen in FIG. 5, the clutch arrangement 300 provides a smaller package within the transmission assembly 124, thereby saving space and/or cost. For example, the clutch arrangement 300 in various examples has a configuration with three integrated pieces including the rotating clutch drum 400, the gear 414, and a shaft 422. The configuration of the clutch arrangement 300 allows for a reduced length of the shaft 422 and the clutch arrangement 300 also provides for mounting of one or more e-machines (e.g., for example EVTs, such as two electric motor generators (MGs) 500 and 502 illustrated in FIG. 6) within the housing 126 of the transmission assembly 124 as described in more detail herein.

Figure 6:
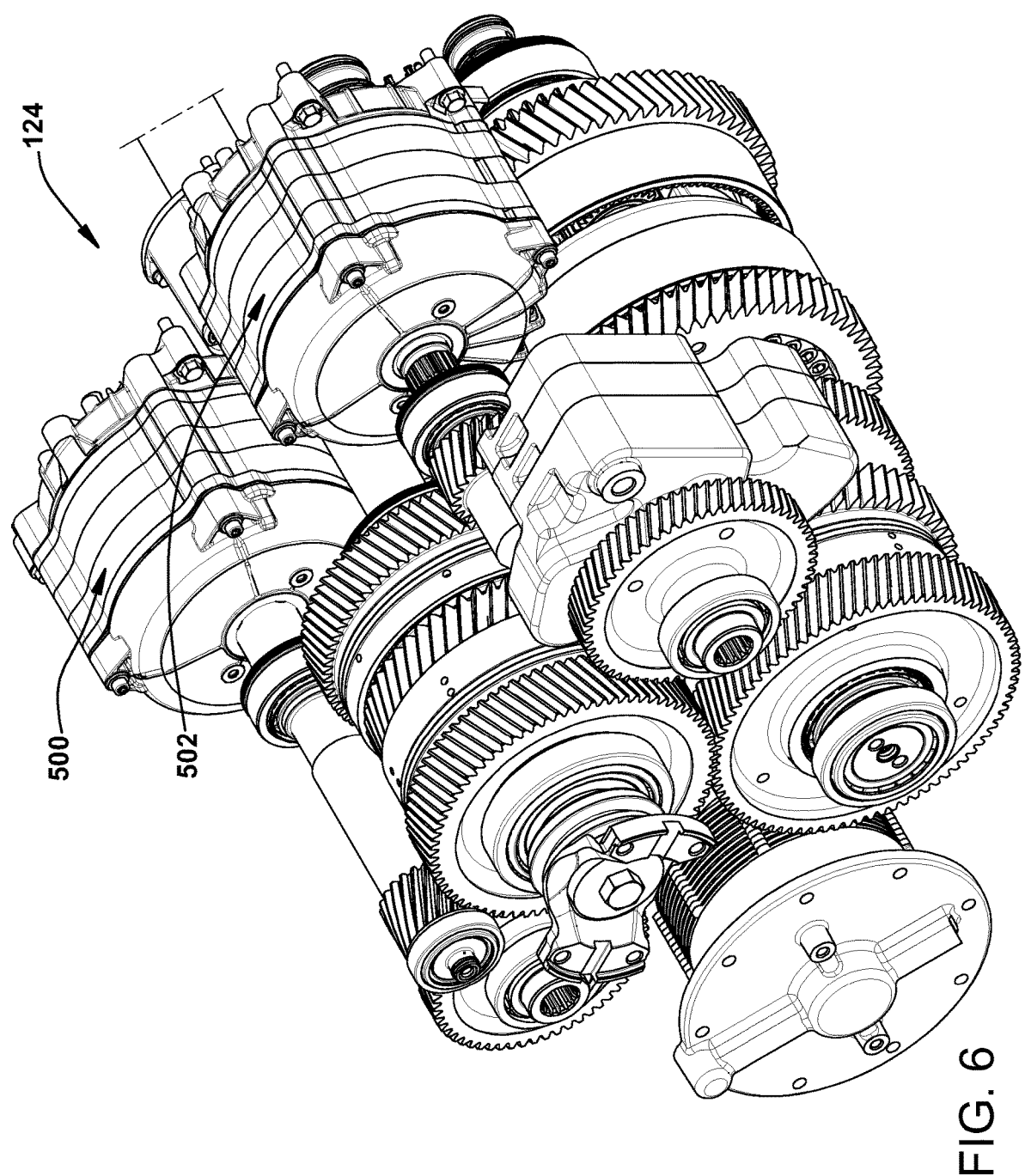
FIG. 6 is a perspective view of a portion of a transmission assembly according to one implementation with a housing removed.
Figure 7:
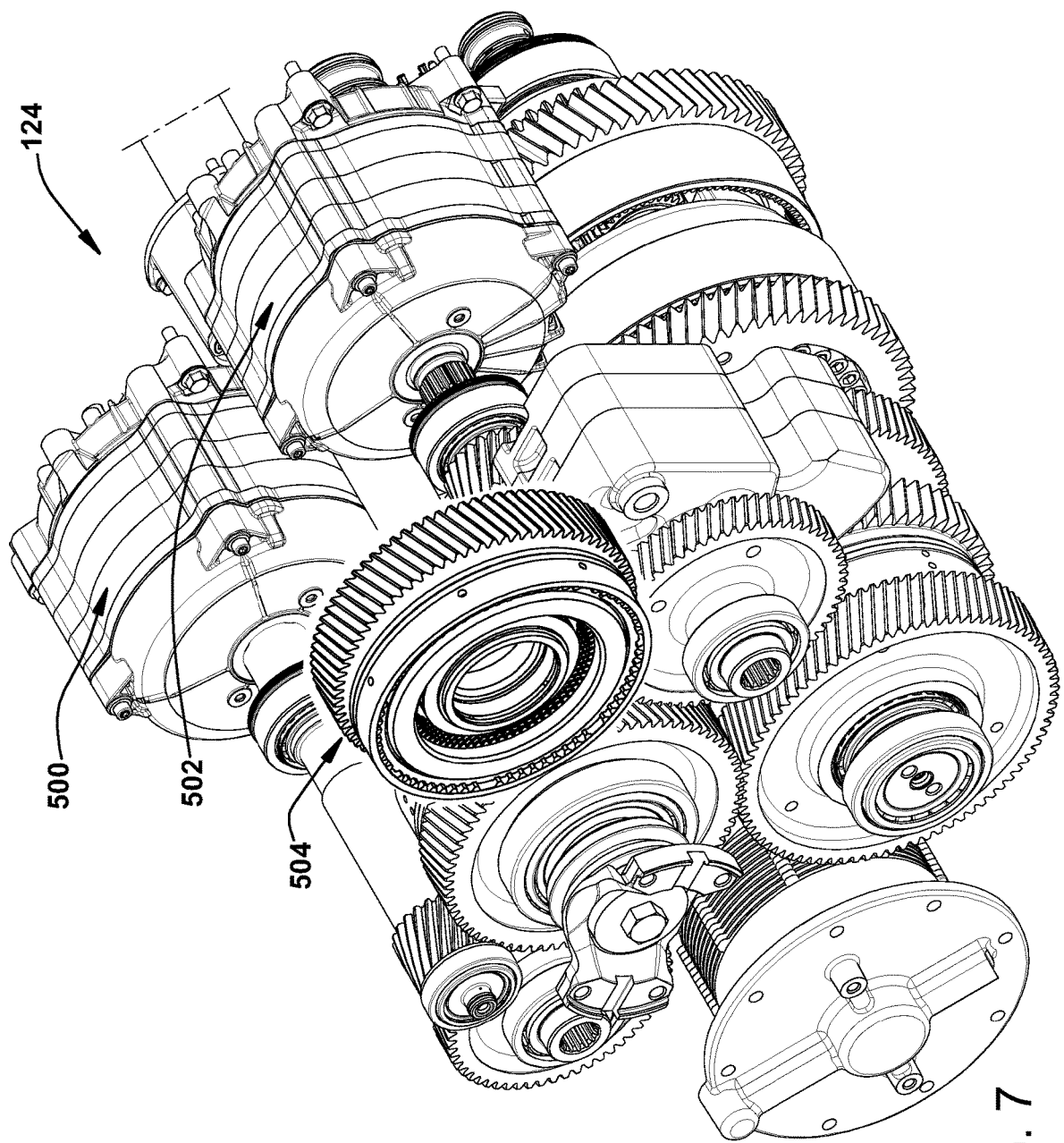
FIG. 7 is another perspective view of a portion of a transmission assembly according to one implementation with a housing removed.

More particularly, and with respect to the e-machines shown in FIG. 6 as MGs 500 and 502, the MGs 500 and 502 generate electric power and are part of the summing planetaries (e.g., summing planetary gear set group 152 shown in FIG. 2) that provide a variable output. In operation, the MG 500 (also referred to as MG1) generates electricity and uses an inverter to transmit power on a DC bus, with another inverter providing the variable output. In some examples, the MG 502 (also referred to as MG2) is coupled with the sun gears 220 and 236 (shown in FIG. 2). In operation, for example in mode 1, power from the engine 122 (e.g., one-hundred percent of the generated power) is transferred to the MG 500 via the transmission input shaft 304 and converted to electrical power and transmitted to the MG 502, which can then be converted back to mechanical power through the mode 1 clutch drum 504 as illustrated in FIG. 7. As should be appreciated, in the illustrated example, in operation, the MG 500 is continually spinning and generating electrical power and the rotating clutch drum 400 is driven by the MG 502.

The MGs 500 and 502 are located within the dimensions of the housing 126 of the transmission assembly 124. That is, the clutch arrangement 300 provides a configuration wherein the MGs 500 and 502 are mounted within the housing 126 of the transmission assembly 124 (the housing 126 is removed in order to show the MGs 500 and 502 therein) instead of outside the housing 126 of the transmission assembly 124.

Figure 8:
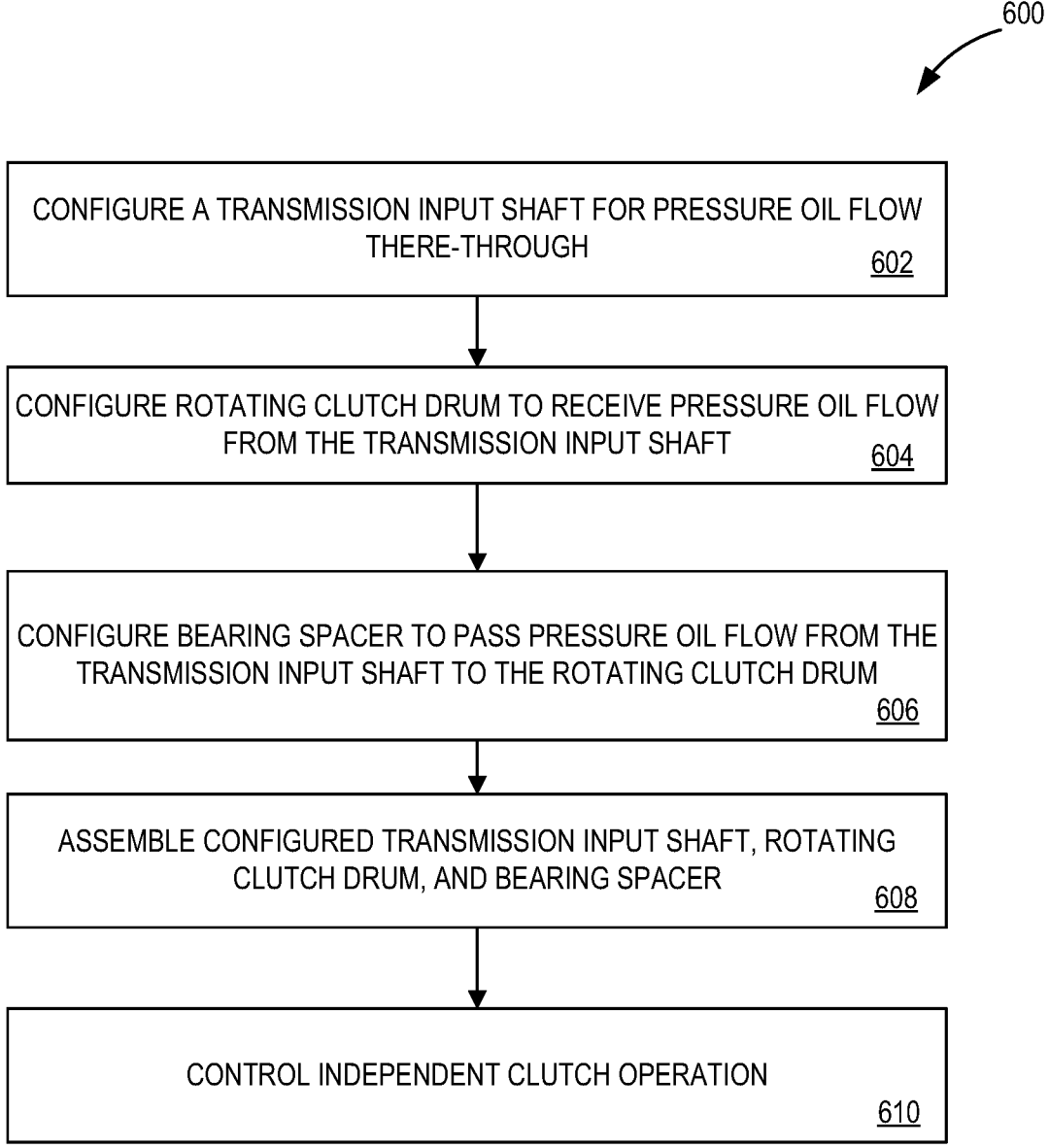
FIG. 8 illustrates an example of a method for clutch operation according to one implementation.

A clutch arrangement is thereby provided and operates using an independently rotating clutch drum in various examples. For example, the clutch arrangement 300 described herein, while supported on the transmission input shaft 304, operates independently of the transmission input shaft 304 to provide independent clutch operation as illustrated in the flowchart 600 of FIG. 8. That is, the flowchart 600 illustrates operations involved in transmission clutch operation using, for example, an independently rotating clutch drum, such as the rotating clutch drum 400 according to various examples. That is, in some examples, the operations of the flowchart 600 are performed using the rotating clutch drum 400 as described in more detail herein. The flowchart 600 commences at operation 602, which includes configuring a transmission input shaft, such as the transmission input shaft 304, to allow pressure oil flow therethrough, such as through a bore or conduit within the transmission input shaft. For example, as described in more detail herein, the shaft is configured to have an oil pressure path longitudinally therethrough, such as the clutch apply pressure path 404.

A rotating clutch drum is configured at operation 604 to receive pressure oil flow from the transmission input shaft. For example, the rotating clutch drum is configured to have a complementary oil flow path defined by a bore or conduit and mating with the bore or conduit of the shaft. In some examples, the conduit 434 is configured to be complementary to the conduit 430 with an intermediate conduit (e.g., the conduit 432 of the bearing spacer 308) therebetween. That is, a bearing spacer is configured at operation 606 to pass pressure oil flow therethrough from the shaft to the rotating clutch drum, such that fluid communication is provided (such as to the piston 406 of the rotating clutch drum 400).

Assembly of the configured transmission input shaft, configured rotating clutch drum, and configured bearing spacer with sealing members (e.g., the rotating drum sealing rings 310) is performed at operation 608. For example, the rotating clutch drum 400 is mounted surrounding and radially supported by the transmission input shaft 304 to allow independent rotation of the rotating clutch drum 400 about the input shaft 304 as described in more detail herein. The complementary conduits provide a clutch apply pressure path through the transmission input shaft 304 and to the rotating clutch drum 400.

The rotating clutch drum 400 is then controlled (e.g., gear actuation by the rotating clutch drum 400) using the clutch apply pressure path. That is, independent clutch operation is thereby provided at operation 610.

Thus, one or more examples provide an independently rotating clutch drum for a transmission assembly, for example, a transmission assembly for a tractor. The arrangement allows for independent operation of the rotating clutch drum 400 from the transmission input shaft 304.

Figure 9:
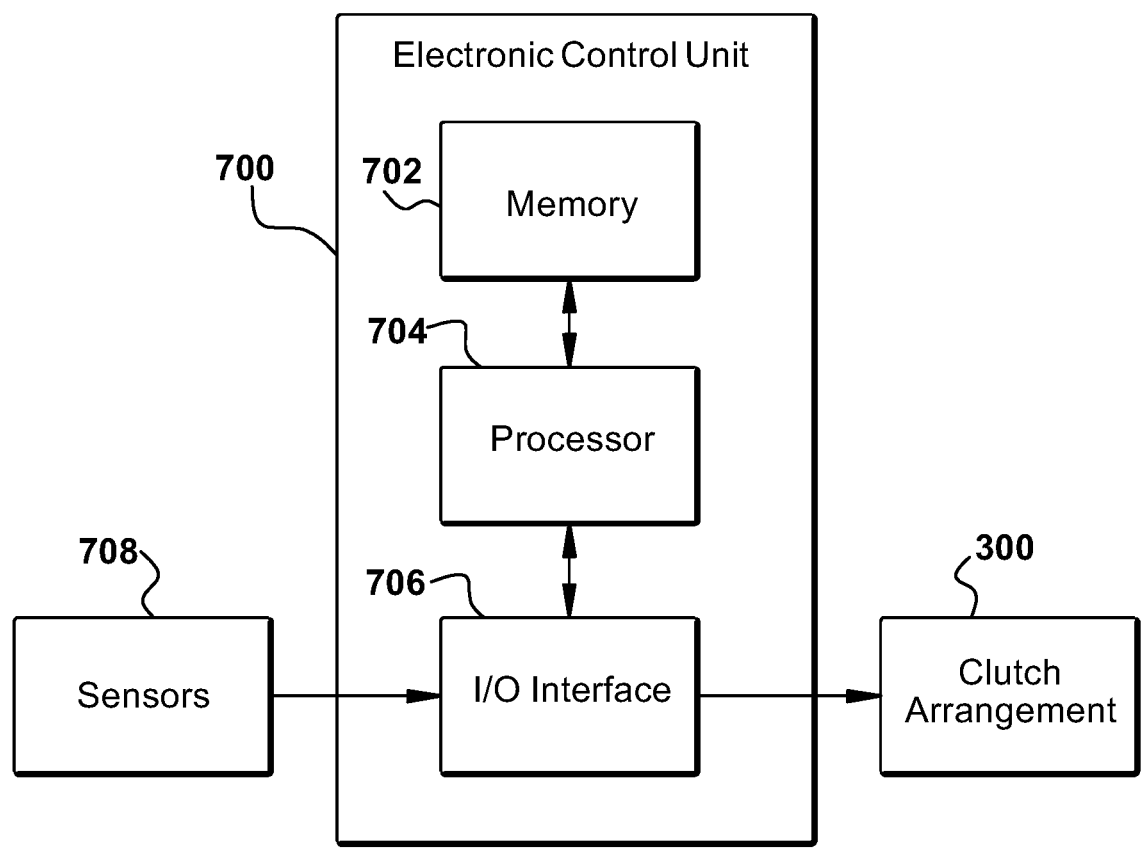
FIG. 9 is a block diagram of an electronic control unit usable with one or more implementations.

In some examples, an electronic control unit (ECU) 700 is configured to control various aspects of the operation of the vehicle 100, such as to actuate the clutch arrangement 300. FIG. 9 illustrates an example of the ECU 700. The ECU 700 includes a plurality of electrical and electronic components that provide power, operational control, and protection to the components and modules within the ECU 700. In particular, the ECU 700 includes, among other things, an electronic processor 704 (e.g., a programmable microprocessor, microcontroller, or similar device), non-transitory, machine-readable memory 702, and an input/output interface 706. The electronic processor 704 is communicatively coupled to the memory 702. The electronic processor 704 is configured to retrieve from the memory 702 and execute, among other things, instructions related to various control processes and methods, such as to control gearing or clutch operation. In some examples, the ECU 700 includes additional, fewer, or different components. The ECU 700 may also be configured to communicate with external systems including, for example, other components of the vehicle 100 and/or operator controls.

The ECU 700 in the illustrated example is communicatively coupled to a plurality of sensors 708, such as related to vehicle speed, braking, gear selection, etc. The ECU 700 in some examples receives a signal input from one or more of the sensors 708 indicative of, for example, an operating state of the vehicle 100. The input/output interface 706 facilitates communication between the ECU 700 and the clutch arrangement 300, such as by controlling one or more aspects of the vehicle 100 to actuate the clutch arrangement 300. Through the input/output interface 706, the ECU 700 is configured, for example, to control different operations of the vehicle 100.

It should be noted that the memory 702 in some examples includes any computer-readable media. In one example, the memory 702 is used to store and access instructions configured to carry out the various operations disclosed herein. In some examples, the memory 702 includes computer storage media in the form of volatile and/or nonvolatile memory, removable or non-removable memory, data disks in virtual environments, or a combination thereof. In one example, the processor(s) 704 includes any quantity of processing units that read data from various entities, such as the memory 702. Specifically, the processor(s) 704 are programmed to execute computer-executable instructions for implementing aspects of the disclosure. In one example, the instructions are performed by the processor(s) 704 and the processor 704 is programmed to execute instructions such as those to perform one or more operations discussed herein and depicted in the accompanying drawings.

It should also be noted that computer readable media comprises computer storage media and communication media. Computer storage media include volatile and non-volatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface,"and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has,""with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A clutch arrangement, comprising:
   a transmission input shaft having a conduit therethrough;
   a rotating clutch drum configured to rotatably couple to the transmission input shaft and operate independent of the transmission input shaft, the rotating clutch drum having a conduit complementary to the conduit of the transmission input shaft; and
   a bearing spacer between the transmission input shaft and the rotating clutch drum, the bearing spacer having a conduit complementary to the conduit of the transmission input shaft and the conduit of the rotating clutch drum, wherein the conduits of the bearing spacer, the transmission input shaft, and the rotating clutch drum define a clutch apply pressure path to control actuation of the rotating clutch drum.

2. The clutch arrangement of claim 1, wherein the conduit of the transmission input shaft extends in a first direction at least longitudinally through a body of the transmission input shaft.

3. The clutch arrangement of claim 2, wherein the conduit of the transmission input shaft further extends in a second direction perpendicular to the first direction and radially outward from the body to the conduit of the bearing spacer.

4. The clutch arrangement of claim 1, wherein the conduit of the rotating clutch drum is angled relative to the conduit of the transmission input shaft and the conduit of the bearing spacer.

5. The clutch arrangement of claim 1, further comprising clutch support bearings between the transmission input shaft and the rotating clutch drum and maintained in position relative to the bearing spacer with one or more springs.

6. The clutch arrangement of claim 5, wherein the clutch support bearings are angled relative to the bearing spacer as a statistically set bearing set and positioned along sides of the bearing spacer.

7. The clutch arrangement of claim 1, further comprising a plurality of rotating drum sealing rings between the rotating clutch drum and the bearing spacer.

8. The clutch arrangement of claim 1, wherein the rotating clutch drum comprises a piston and the conduit of the rotating clutch drum is in fluid communication with the piston.

9. The clutch arrangement of claim 8, wherein when a clutch is engaged by the rotating clutch drum, a first gear connects to a second gear and the first and second gears rotate at a same speed independent of a rotation of the transmission input shaft.

10. The clutch arrangement of claim 1, wherein the rotating clutch drum is not torque coupled to the transmission input shaft.

11. A transmission, comprising:
a housing;
a clutch arrangement mounted within the housing, the clutch arrangement comprising:
a transmission input shaft having a conduit therethrough;
a rotating clutch drum configured to rotatably couple to the transmission input shaft and operate independent of the transmission input shaft, the rotating clutch drum having a conduit complementary to the conduit of the transmission input shaft; and
a bearing spacer between the transmission input shaft and the rotating clutch drum, the bearing spacer having a conduit complementary to the conduit of the transmission input shaft and the conduit of the rotating clutch drum, wherein the conduits of the bearing spacer, the transmission input shaft, and the rotating clutch drum define a clutch apply pressure path to control actuation of the rotating clutch drum; and
at least one electric motor generator (MG) mounted within the housing and coupled to the clutch arrangement.

12. The transmission of claim 11, wherein the at least one electric MG is configured to operate with an electric variable transmission (EVT).

13. The transmission of claim 11, wherein rotating clutch drum comprises an integrated clutch drum, gear, and shaft arrangement.

14. The transmission of claim 11, wherein the clutch arrangement is configured to operate one or more gears of a work vehicle.

15. The transmission of claim 11, wherein the conduit of the transmission input shaft extends in a first direction at least longitudinally through a body of the transmission input shaft, and further extends in a second direction perpendicular to the first direction and radially outward from the body to the conduit of the bearing spacer.

16. The transmission of claim 11, wherein the conduit of the rotating clutch drum is angled relative to the conduit of the transmission input shaft and the conduit of the bearing spacer, and the clutch arrangement further comprises clutch support bearings between the transmission input shaft and the rotating clutch drum and maintained in position relative to the bearing spacer with one or more springs, the clutch support bearings being angled relative to the bearing spacer as a statistically set bearing set and positioned along sides of the bearing spacer.

17. The transmission of claim 11, wherein clutch arrangement further comprises a plurality of rotating drum sealing rings between the rotating clutch drum and the bearing spacer.

18. The transmission of claim 11, wherein the rotating clutch drum comprises a piston and the conduit of the rotating clutch drum is in fluid communication with the piston, and the piston engages a gear of a transmission assembly of a work vehicle.

\* \* \* \* \*